United States Patent [19]
Shuler

[11] 3,791,402
[45] Feb. 12, 1974

[54] HANDLE REPLACEMENT APPARATUS

[75] Inventor: James F. Shuler, Grand Rapids, Mich.

[73] Assignee: Park Electrochemical Corp., Great Neck, N.Y.

[22] Filed: Oct. 24, 1972

[21] Appl. No.: 300,210

[52] U.S. Cl.................................. 137/315, 16/121
[51] Int. Cl............................................ F16k 43/00
[58] Field of Search... 137/269, 271, 315, 316, 327, 137/328, 329, 329.1, 801, 802; 16/110, 114, 121; 292/347

[56] References Cited
UNITED STATES PATENTS
2,592,256  4/1952  DuCharme.......................... 137/315
3,503,586  3/1970  Bordes............................ 137/315 X Primary Examiner—Martin P. Schwadron
Assistant Examiner—David R. Matthews
Attorney, Agent, or Firm—Darby and Darby

[57] ABSTRACT

Handle replacement apparatus which is particularly adapted for plumbing fixtures is described. The apparatus consists of a replacement handle and a separate insert. The insert fits onto a valve stem and is locked in place at three points. The handle fits onto the insert.

7 Claims, 4 Drawing Figures

PATENTED FEB 12 1974 3,791,402

HANDLE REPLACEMENT APPARATUS

This invention generally relates to handle or faucet replacement apparatus.

Handles and faucets, particularly those used in plumbing facilities, often become damaged due to excessive use and must be replaced.

In handle or faucet replacement apparatus heretofore available, it was necessary for custom made knife clamps or molded inserts to be fitted within the replacement handle so that the clamps or inserts could mate with the ribs of the valve stem. However, during the replacement operation, the knife clamps were often damaged and the threads of the insert were often stripped. Furthermore, handle replacement apparatus heretofore available could only be used for certain types and sizes of valve stems, and if the stems were badly damaged the handle replacement apparatus could not be used at all.

It is therefore an object of this invention to provide handle replacement apparatus which is suitable for use with stems of any configuration size and material, and badly damaged valve stems.

It is a further object of this invention to provide handle replacement apparatus which is interchangeable with any type of handle.

It is a further object of this invention to provide handle replacement apparatus in which replacement handles with variable skirt lengths can be used.

Briefly, the handle replacement apparatus of this invention consists of a replacement handle and a locking insert. The locking insert is attached to the valve stem by positioning the insert on the stem and tightening three set screws located on the locking insert. The replacement handle is then fitted over the insert and a mounting screw which passes through the locking insert attaches the handle to the valve stem.

These and other objects and features of this invention are illustrated in the drawings accompanying this application in which.

Figure 1:
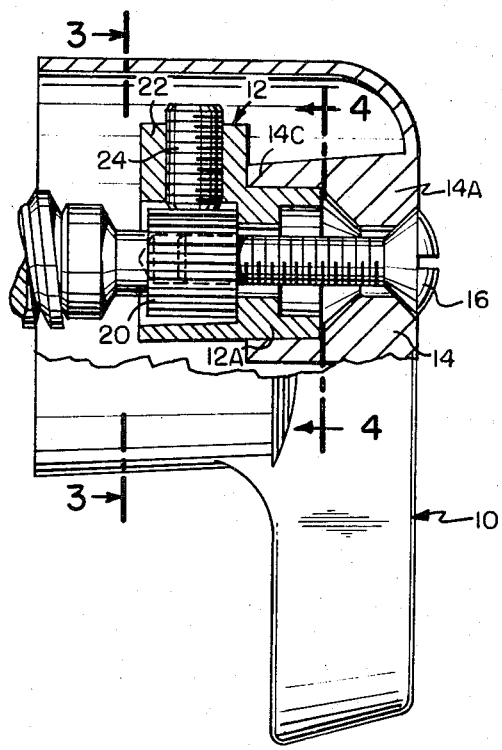
FIG. 1 is a side elevational view, partially cut away, of the handle replacement apparatus of this invention.

Referring now to FIG. 1, the handle replacement apparatus of this invention basically consists of a replacement handle 10 and a locking insert 12. The replacement handle 10 has a hollow rectangular boss 14 depending downwardly from its inside surface. The boss 14 is cast into the replacement handle. The boss lowermost portion 14C is dimensioned so that it fits over the uppermost portion 12A of the locking insert. The boss uppermost portion 14A is dimensioned to receive the mounting screw 16.

The replacement handle 10 illustrated in FIG. 1 is only one of the many types of replacement handles that could be used in the practice of this invention. Handles of other various shapes and sizes could be used. It is only essential that an internal boss be formed on the inside of the replacement handle that is adapted to fit the locking insert. The locking insert must merely be coupled to the handle in a secure manner.

Figure 2:
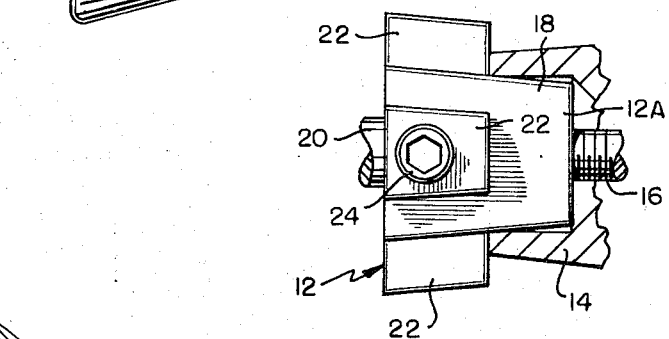
FIG. 2 is a side elevational view of the locking insert.
Figure 3:
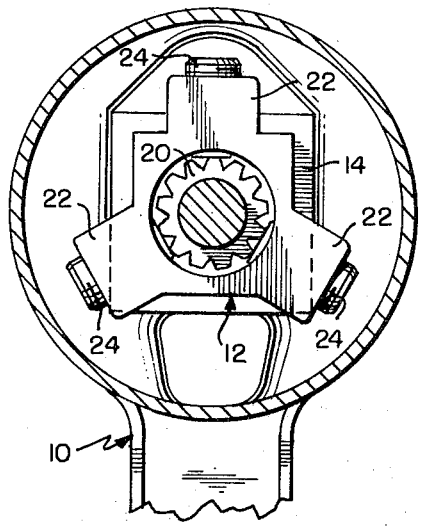
FIG. 3 is a cross-sectional view of the handle replacement apparatus illustrated in FIG. 1 taken along the line 3—3.
Figure 4:
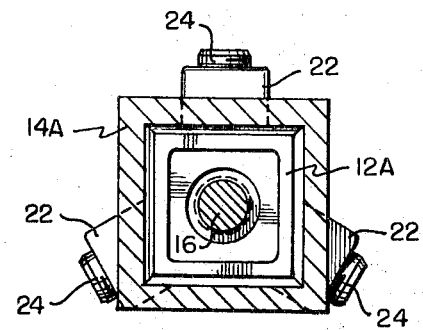
FIG. 4 is a cross-sectional view of the handle replacement apparatus illustrated in FIG. 1 taken along the line 4—4.

Referring now to FIGS. 2 and 3, the locking insert 12 is essentially a rectangularly shaped nut which is adapted to fit over the valve stem. A generally cylindrical cavity is formed along the longitudinal axis of the locking insert to receive the stem 20. The cylindrical cavity is dimensioned so that it is sufficiently large to accept valve stems having large diameters, such as for example, three-eighths of an inch.

Thre bosses 22 are formed about the periphery of the locking insert lowermost portion 12B. Each of the bosses is spaced approximately 120° apart. A laterally extending set screw 24 is mounted in each of the bosses. The set screws extend through the bosses to the cylindrical cavity formed within the locking insert. The three set screws are adapted to engage the portion of the stem within the cylindrical cavity. The set screws may be of any type such as point set screws, cupped set screws, or any combination of various types of set screws.

In using the handle replacement apparatus of this invention, the locking insert is first placed on the valve stem which requires a replacement handle. The locking insert is adjusted on the stem so that any of the four planar sides of the insert is parallel with the front of the faucet. The set screws are then tightened. Since various types of set screws may be used in the practice of this invention, even if the stem had no ribs whatsoever and was of any shape, the locking insert could be attached to the stem. Also, if the ribs of the stem were damaged, the locking insert could still be attached to it. Another feature of this invention is that the use of three set screws positioned 120° apart to engage the valve stem, reduces the stress on the valve stem thereby permitting the insert to be used to lock valve stems composed of various soft materials, such as plastic. Furthermore, the height of the stem is inconsequential since the locking insert can be positioned at any height on the stem. The user need only choose a replacement handle having a skirt length sufficiently long to cover the stem and/or the bonnet, as required.

In tightening the set screws in the locking insert, it is important to align the cylindrical hole in the center of the insert with the hole in the top of the stem so that both holes have the same central axis.

After the set screws have been tightened, the particular replacement handle to be used is fitted over the locking insert so that the rectangular boss of the replacement handle fits over the uppermost portion of the locking insert. A mounting screw is then placed through the replacement handle and the locking insert, and threaded into the stem hole. The mounting screw, of course, connects the handle to the stem.

While the principles of the invention have now been made clear in the illustrated embodiments, it will be immediately obvious to those skilled in the art that many modifications may be made in the structure, arrangement and proportions of the elements, materials and components used in the practice of the invention, without departing from the invention. The appended claims are, therefore, intended to cover and embrace any such modifications, within the limits only of the true spirit and scope of the invention.

What is claimed is:

1. Handle replacement apparatus for use with a valve stem comprising a handle member, said handle member having a skirt portion adapted to surround the valve stem, a first polygonal member being formed on said handle member, said first polygonal member being hollow and being centrally located within said handle member skirt portion; and a second polygonal member, said second polygonal member being hollow and having an uppermost portion and a lowermost portion, said second polygonal member uppermost portion fitting within said first polygonal member, means for engaging a portion of the valve stem and for locking said second polygonal member onto the valve stem, said engaging and locking means including at least three laterally extending members positioned about the periphery of said second polygonal member lowermost portion, said laterally extending members being adapted to engage the valve stem at three distinct points.

2. The handle replacement apparatus recited in claim 1, each of said laterally extending members being spaced 120° apart on said second polygonal member lowermost portion.

3. The handle replacement apparatus recited in claim 1, said first polygonal member having four planar sides, said second polygonal member uppermost portion having four planar sides.

4. The handle replacement apparatus recited in claim 1, said locking and engaging means further including at least three laterally extending protuberances projecting outwardly from the sides of said second polygonal member lowermost portion, each of said laterally extending members being positioned within one of said three laterally extending protuberances, the top surface of each of said three laterally extending protuberances engaging the bottom surface of said first polygonal member.

5. The handle replacement apparatus recited in claim 1, the central axis through said first and second polygonal members being coincident with the central axis through the valve stem.

6. Handle replacement apparatus for use with a valve stem comprising a handle member, said handle member having a skirt portion adapted to surround the valve stem, a receiving member being formed on said handle member within said skirt portion, said receiving member including four planar side walls perpendicularly arranged with respect to one another, the inner surfaces of said receiving member planar walls thereby forming a first rectangular space, a first cavity being formed in said handle member, the central axis through said first cavity being coincident with the central axis through said first rectangular space; and an inserting member having an uppermost portion and a lowermost portion, said inserting member including four planar side walls perpendicularly arranged with respect to one another, the outer surfaces of said inserting member planar walls thereby forming a first rectangular solid, said first rectangular solid fitting snugly within said first rectangular space, a second cavity being formed in said inserting member for receiving the valve stem, the central axis through said cavity being coincident with the central axis through said first rectangular space, at least three laterally extending protuberances formed on the lowermost portion of said inserting member, said protuberances being spaced 120 degrees apart, a screw being threaded into each of said protuberances, each of said screws being adapted to engage the valve stem at a distinct point, the top surface of each of said protuberances engaging the bottom surface of said receiving member.

7. Handle replacement apparatus for use with a valve stem comprising a handle member, said handle member having a skirt portion adapted to surround the valve stem, a first polygonal member being formed on said handle member, said first polygonal member being centrally located within said handle member skirt portion; and a second polygonal member, said second polygonal member having an uppermost portion and a lowermost portion, said second polygonal member uppermost portion mating with said first polygonal member, means for engaging a portion of the valve stem and for locking said second polygonal member onto the valve stem, said engaging and locking means including at least three laterally extending members positioned about the periphery of said second polygonal member lowermost portion, said laterally extending members being adapted to engage the valve stem at three distinct points.

* * * * *